March 15, 1927.  B. J. KEELAN  1,620,897

WHEEL

Filed Dec. 8, 1925

INVENTOR,
Bernard J. Keelan;
BY
ATTORNEYS.

Patented Mar. 15, 1927.

1,620,897

UNITED STATES PATENT OFFICE.

BERNARD J. KEELAN, OF LOS ANGELES, CALIFORNIA.

WHEEL.

Application filed December 8, 1925. Serial No. 74,016.

This invention relates to wheels, and particularly to a resilient type of wheel. The present invention has reference to means adapted to take the place of the ordinary tire of the pneumatic type now generally used on motor vehicles.

The provision of tires for vehicles is quite an item of expense with tires at all times subjected to liability to puncture, and due to the present inflation of the rubber market the replacement of tires after a few thousand miles of use, is an item of expense to be considered. While my invention relates to resilient wheels in general, still my invention is so formed that it is adapted to be handled in a commercial way the same as the ordinary pneumatic tire with the said invention in such form as to render its application to the standard form of vehicle wheel an easy matter and within a minimum of time, the same as in the case of changing ordinary pneumatic tires on vehicle wheels.

In practicing the invention I provide a rim which is adapted to hold and carry a series of sectional spring members and with a tread member connecting such sectional spring members. The general contour or end view of each sectional spring member is equivalent to a transverse sectional view of the ordinary tire carcass now generally used. The different sectional spring members cooperate to provide what may be termed a resilient tire comprising springs and which would function in all respects the same as the ordinary pneumatic tire, with the exception that the present invention is more durable, not liable to puncture, and so arranged that the same may be readily retread when the tread portion becomes worn.

An object of my invention is to provide a device of the character above stated, which is simple of construction and generally superior.

With the above and other objects in view, the invention consists in the novel and useful provision, formation, construction, association and relative arrangement of parts, members and features, all as shown in certain embodiments in the accompanying drawing, described generally and more particularly pointed out in the claims.

In the drawing.

Corresponding parts in all the figures are designated by the same reference characters.

Figure 1:
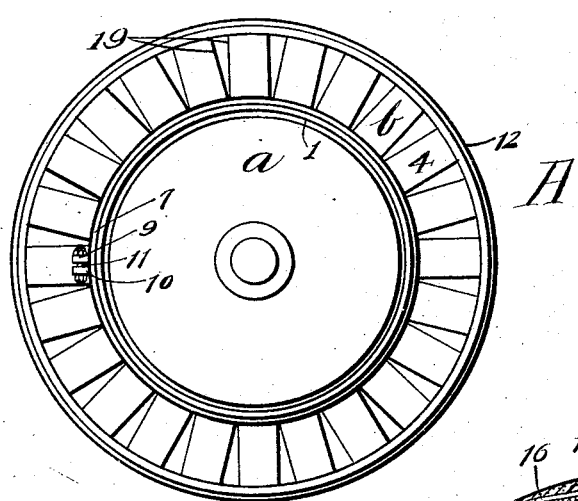
Figure 1 is an elevation of my improved resilient wheel considered as an entirety.
Figure 3:
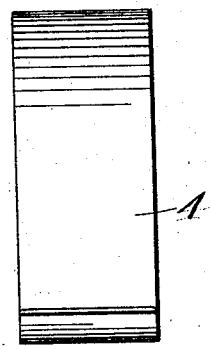
Figure 3 is a side elevation of one of the sectional resilient members forming a part of the invention.

Referring with particularity to the drawing, the improved resilient wheel is designated as an entirety by A, of which $a$ constitutes a portion of the wheel, and $b$ resilient means for the wheel, both of which elements are used in practicing one embodiment of the invention. The wheel $a$ may be of any form whether spoke or otherwise, and in the present invention the wheel $a$ is of the disc type. The means $b$ is adapted to take the place of the ordinary pneumatic tire which would ordinarily be carried on the disc $a$. The means $b$ includes a rim 1 adapted to be secured to the disc wheel $a$ in any approved manner and which rim is provided with two spaced curved annular flange portions 2 and 3, and a plurality of sectional resilient members 4 having ends thereof 5 and 6 curved to fit within the curved flanges 2 and 3 respectively of the rim, and with clincher rings 7 and 8 for engagement with such curved ends for maintaining the sectional member 4 to the rim. These members 4 may be formed of spring-like material such as spring steel and which are bowed transversely and then reversedly curved adjacent their terminal portions, as shown at 5 and 6. This bowed portion resembles a transverse section of the ordinary pneumatic tire carcass.

Figure 4:
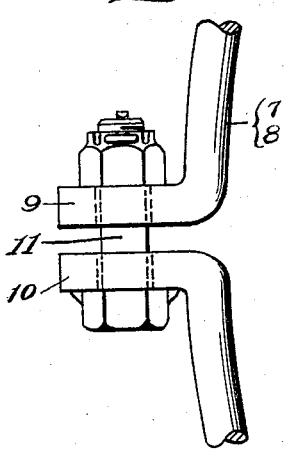
Figure 4 is a fragmentary enlarged view of one of the clincher rings.

Assuming that I have provided a plurality of sections 4 I mount the same upon the rim 1, as shown in Figure 1, the ends of the reversedly curved portions of each section being adjacent each other. The clincher rings are adapted to hold the said sections to the said rim. The clincher rings may be of any form desired, such as that shown in Figure 4, which figure is illustrative of the split type of clincher ring, which is to say, the ring is a split annulus with two outstanding lugs 9 and 10 which are provided with aligned bores through which a lock bolt 11 is passed so that the two lugs may be drawn together to lessen the diameter of the annulus and thereby properly clinch the elements 4 to the rim. The assembled resilient elements 4 have an inter-connecting tread 12, and in part embedded within said tread are inter-connected links of chains 13. It will be noted that each link has a loop portion 14 which extends inwardly from the inner surface 15 of the tread, and that other curved portions of each link are within the tread proper. This method of construction permits the tread to be placed upon the sectional pieces 4. For instance, in the showing of Figure 2 we have in transverse section a portion of the tread with five links of a series of chains, and I extend between the curved portions 14 and the inner-surface of each section 4 a cable 17. I also provide cables 18 which are included between the curved portions 16 and the outer surface of each section 4, and these cables interconnect the different sections. This method of construction permits of flexibility and unit functioning of each section 4.

It is to be noted that the sections diverge or separate, as shown at 19 adjacent the tread. However, the cables which unite the tread to the sections form a bond between such divergent portions of the sections and likewise so that the different sections will operate together where they contact with the ground or other surface and in such a manner as not to cut the tread where it lies in such divergent portion between the sections.

Figure 2:
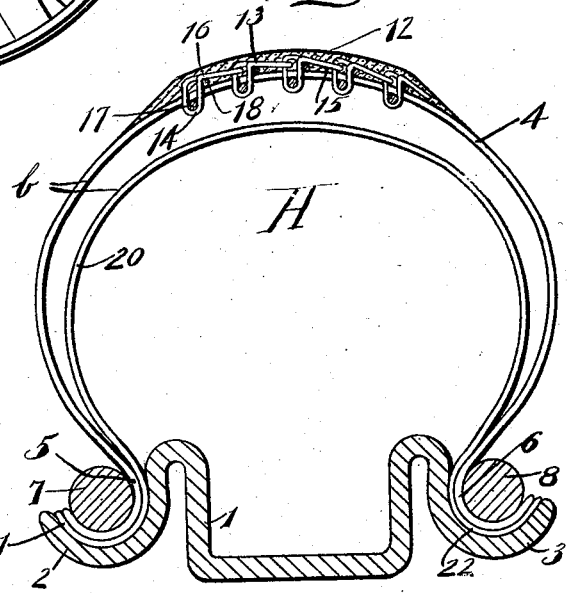
Figure 2 is a cross sectional view showing a portion of the resilient tire and on an enlarged scale from the showing of Figure 1.

The tread could be made with the chains therein and then passed over the peripheries of the different sections, after which the flexible cables could be inserted on both sides of the sections to securely anchor the tread to the sections. As a further precaution against undue flexibility under load of the various sections 4, I have provided other sections 20 which lie within the sections 4, and likewise spaced from such sections 4, all as indicated in Fig. 2. The sections 20 are provided with reversibly curved flanges 21 and 22 which cooperate with the reversibly curved flanges 5 and 6 of the sections 4 and are received within the flange portions 2 and 3 of the rim. After the section or sections 4 have moved downwardly a certain distance under an applied load, the said sections will contact with the sections 20 and tend to move them. The precise manner by which the rim 1 is held to the wheel is not a feature of the invention as it may be held in any approved manner.

Figure 5:
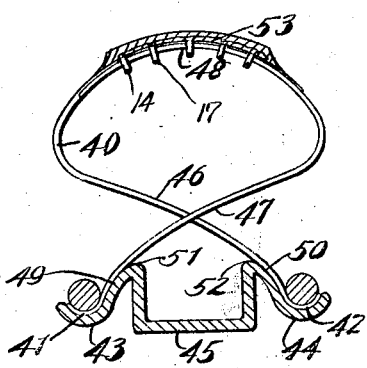
Figure 5 is a view similar to Figure 2 showing a modification of my invention.

The modification of my invention shown in Fig. 5 does not differ essentially from the form shown in the other figures, with the possible exception that the different sections are crossed, which is to say, I provide sections 40 formed of spring-like material, the ends of which are reversibly curved as shown at 41 and 42 so as to be received in the annular curved flange portions 43 and 44, respectively, of a rim 45, with portions extending outwardly from said curved portions which are crossed, as shown at 46 and 47 and then merged into a curved loop 48. The rim slopes inwardly from the curved annular flange portions, as shown at 49 and 50 and the portions 46 and 47 of the flexible means follow the general contour of the rim at the portions 49 and 50, with the result that there are fulcrumed zones 51 and 52 provided for such flexible members. The curved or looped portion may have its periphery covered with a tread 53 the same as previously shown. When a load is imposed upon a tread the portions 46 and 47 will tend to bend over the fulcrumed zones and yieldingly resist load effect on such tread. Clincher rings are provided as before.

I have provided in this invention a resilient tire formed of sections, each section of which is made of a flexible material capable in and of itself of sustaining weight without need of auxiliary means such as air in such sustenation.

It is obvious that various changes and modifications may be made in practicing the invention, in departure from the particular showing of the drawing, without departing from the true spirit of the invention.

Having thus disclosed my invention, I claim and desire to secure by Letters Patent:

1. In a device of the character disclosed, a tire comprising an annular series of segmental springs, a tread upon said springs, a series of chains within said tread, said chains being provided with loops adapted to extend inwardly from said tread and be received between the segmental springs, and means adapted to be passed through said loops for maintaining the tread to said segmental springs.

2. In a device of the character disclosed, a tire comprising an annular series of segmental springs, a tread upon said springs, a series of chains within said tread, said chains being provided with loops adapted to extend inwardly from said tread and be received between the segmental springs, and means adapted to be passed through said loops for maintaining the tread to said segmental springs; said last named means comprising cables received within such segmental springs, and further means included between the chain, tread and outer surface of the segmental springs for interconnecting said segmental springs.

In testimony whereof, I have signed my name to this specification.

BERNARD J. KEELAN.